(12) United States Patent
Mason

(10) Patent No.: US 10,279,827 B1
(45) Date of Patent: May 7, 2019

(54) ANGLE BAR SELF-LOADING DOLLY

(71) Applicant: Paul Mason, Minden, NV (US)

(72) Inventor: Paul Mason, Minden, NV (US)

(*) Notice: Subject to any disclaimer, the term of this patent is extended or adjusted under 35 U.S.C. 154(b) by 0 days.

(21) Appl. No.: 15/987,695

(22) Filed: May 23, 2018

(51) Int. Cl.
*B62B 3/02* (2006.01)
*B62B 3/10* (2006.01)
*B60B 29/00* (2006.01)

(52) U.S. Cl.
CPC .............. *B62B 3/02* (2013.01); *B60B 29/001* (2013.01); *B62B 3/104* (2013.01); *B62B 2301/05* (2013.01)

(58) Field of Classification Search
CPC ..... B62B 1/264; B60B 29/001; B60B 29/002; B60B 30/04; B60B 30/10
USPC ........................................................ 280/79.4
See application file for complete search history.

(56) References Cited

U.S. PATENT DOCUMENTS

| | | | | |
|---|---|---|---|---|
| 2,362,981 A * | 11/1944 | Baum | ...................... | B64F 1/22 180/14.1 |
| 4,690,605 A * | 9/1987 | Coccaro | ................ | B60B 29/002 254/119 |
| 4,692,082 A * | 9/1987 | Smith | ...................... | B66F 5/02 414/429 |
| 4,854,803 A * | 8/1989 | Coccaro | ................ | B60B 29/002 414/429 |
| 4,904,146 A * | 2/1990 | Lock | ...................... | B60P 3/125 280/402 |
| 4,913,459 A * | 4/1990 | Smeitink | ................. | B66F 7/246 280/641 |
| 5,112,070 A * | 5/1992 | Hahn | .................... | B60B 29/002 280/79.4 |
| 5,248,235 A * | 9/1993 | Poten | ..................... | B66F 7/246 280/43.11 |
| 5,433,469 A * | 7/1995 | Cassels | ................... | B62B 1/264 280/47.27 |
| 5,709,520 A * | 1/1998 | Pish | ........................ | B60S 13/00 254/7 B |
| 5,732,960 A * | 3/1998 | Elam | ..................... | B60B 29/002 254/113 |
| 5,941,675 A * | 8/1999 | Orr | ........................... | B66F 5/02 280/402 |
| 6,106,214 A * | 8/2000 | Saffelle | ................. | B60B 29/002 414/427 |
| 6,171,048 B1 * | 1/2001 | Grimes | ..................... | B62B 3/02 414/427 |
| 6,179,542 B1 * | 1/2001 | Haven | .................. | B60B 29/002 280/43.2 |
| 6,382,644 B1 * | 5/2002 | Rawlings | .............. | B60B 29/002 280/47.35 |
| 6,390,759 B1 * | 5/2002 | Novak | .................... | B62B 5/049 188/5 |
| 6,773,222 B1 * | 8/2004 | Gilchrist | .............. | B60B 29/002 414/426 |

(Continued)

*Primary Examiner* — Jeffrey J Restifo
(74) *Attorney, Agent, or Firm* — Dergosits & Noah LLP; Todd A. Noah

(57) ABSTRACT

A self-loading dolly apparatus. Each of a pair of support bars has a saddle bracket and an inside wheel assembly rigidly affixed with the support bar and offset from the vertical axis. A lift bar is secured to the saddle brackets, then raised so that an outside pair of wheel assemblies can be positioned adjacent the respective saddle bracket. The outside wheel assemblies are secured when the lift bar is raised, whereupon the inside wheel assemblies and the saddle brackets realign with the vertical axis and the support bars are angled upward.

20 Claims, 5 Drawing Sheets

(56) References Cited

U.S. PATENT DOCUMENTS

| | | | | |
|---|---|---|---|---|
| 6,789,994 B2 * | 9/2004 | Tortellier | B60B 29/002 | 414/426 |
| 6,836,942 B2 * | 1/2005 | Oleski | B66F 15/00 | 29/270 |
| 6,860,496 B2 * | 3/2005 | Novak | B62B 5/049 | 211/20 |
| 7,097,406 B1 * | 8/2006 | Gang | B60B 29/002 | 254/105 |
| D532,575 S * | 11/2006 | Oberg | D34/28 | |
| 7,156,403 B2 * | 1/2007 | Abbott | B60P 3/122 | 280/79.11 |
| 7,207,764 B1 * | 4/2007 | Snook | B60B 29/002 | 187/211 |
| 7,275,753 B1 * | 10/2007 | Ceccarelli | B60P 3/127 | 280/43.21 |
| 7,431,314 B2 * | 10/2008 | Donaldson | B60B 29/002 | 280/47.27 |
| 7,673,887 B2 * | 3/2010 | Hassell | B62B 5/0083 | 280/43.21 |
| 7,699,576 B2 * | 4/2010 | Campbell | B60B 29/001 | 414/426 |
| 7,708,516 B1 * | 5/2010 | Snook | B66F 7/065 | 187/211 |
| 7,815,201 B2 * | 10/2010 | Ceccarelli, III | B60P 3/127 | 280/43.21 |
| 8,651,501 B1 * | 2/2014 | Davis | B62B 5/0086 | 254/133 R |
| 8,882,434 B2 * | 11/2014 | LaBruyere | B62B 5/0083 | 280/79.4 |
| 8,910,957 B1 * | 12/2014 | Hassell | B60P 3/127 | 254/105 |
| 8,950,760 B1 * | 2/2015 | Davis | B62B 3/02 | 254/133 R |
| 8,967,637 B2 * | 3/2015 | Perry | B60P 3/11 | 280/47.34 |
| 10,160,468 B1 * | 12/2018 | Hurd | B62B 3/02 | |

* cited by examiner

ANGLE BAR SELF-LOADING DOLLY

TECHNICAL FIELD

This disclosure relates generally to a self-loading dolly useful for lifting and moving heavy objects, such as equipment, aircraft, and vehicles.

BACKGROUND

A dolly is a wheeled platform for moving heavier objects, such as furniture, equipment, aircraft, vehicles, etc. However, many commercially available dollies are either inadequately designed for lifting and moving heavy objects, such as 3000 pounds or more, are overly complex, or are prohibitively expensive for the average consumer or small business.

For example, U.S. Pat. No. 7,597,524 describes a self-loading wheel dolly having a design that is unduly complex. Zendex Tool Corp. sells a similar 4-wheel dolly under the brand name GoJack®, but the GoJack dolly is not useful for vehicles larger than 6300 lbs (1754 lb/wheel). U.S. Pat. No. 7,673,887 describes a simpler wheel dolly, but it is also not heavy duty and is only useful for towing applications.

In addition, the need to lift and move objects in close quarters presents a challenge. For example, the parking valet services available at many hotels are sometimes faced with a car or a truck parked too close to a curb, to other cars, to walls or fences, or other obstacles, where the owner has walked away with the keys, leaving the valet with a dilemma if there is a need to move the vehicle. The valet can call for a roll-back truck to move the vehicle, but such vehicles are rarely on-site and therefore the task often takes some time to accomplish, particularly on busy evenings or weekends.

Thus, there remains a need for an improved dolly that can operate to safely lift particularly heavy objects even a few inches, and even in close quarters. The present disclosure utilizes and expands on the concepts previously disclosed in commonly owned U.S. Pat. No. 9,688,176 entitled Self-Loading Dolly, which is incorporated herein by reference in its entirety.

DETAILED DESCRIPTION

In this disclosure, the terms "vertical" and "horizontal" are used in their ordinary sense to designate the orientation of the various components and to provide context for proper operation of the assembled components under normal conditions. For example, the dolly apparatus disclosed herein will usually be placed on the ground, which may also be referred to as the horizontal plane, and some of the components have angles that may be described in relation to other components, or in relation to the horizontal plane (i.e., the ground) or the vertical plane (i.e., orthogonal to the ground). However, the use of such terms should be interpreted as merely illustrative not limiting.

Similarly, the terms "inside" or "inside end" are used to refer to a position of the dolly or its components that is inside of the tire or object to the moved, i.e., further away from the user, and "outside" or "outside end" are used to refer to a position of the dolly that is outside of the tire/object, i.e., nearer the user.

The structural components described herein should be selected to support a specified load range or a variety of different load ranges in accord with well-known principles of structural engineering, and the size and strength of welds used to construct and/or interconnect the various components must be consistent with such specification. As an example, larger structural components or thicker walls on the structural components will of course support heavier loads. Thus, equipment or machinery loads up to 20,000 pounds or more can be safely lifted and moved through specifying appropriate structural members, welds and wheels for a dolly specification.

The wheel assemblies are generally known caster assemblies that are readily available and should be selected to match the specified load range. In some embodiments, the mounting plates for the caster wheels may be offset from center to permit additional flexibility in configuring the dolly for different applications. For example, securing the wheels to a different portion of the plate may present a different height profile for the dolly relative to the object to be lifted and moved.

The dolly must be lifted in use, and a rolling hydraulic floor jack may suffice for many applications, but other methods could be used, particularly for very heavy objects.

Figure 1:
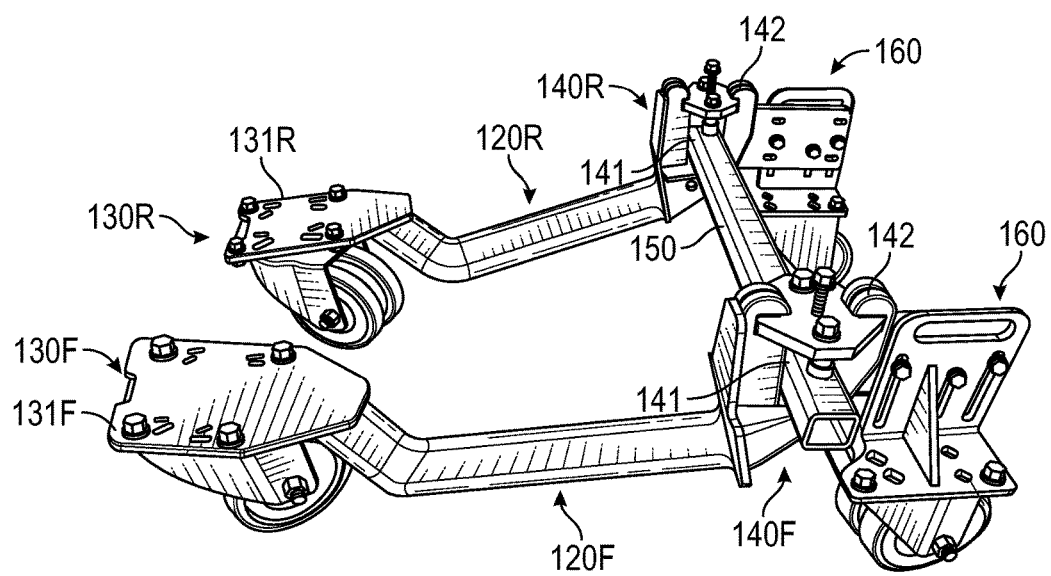
FIG. 1 is a side perspective of a self-loading dolly.

FIG. 1 is a side perspective illustrating a simplified representation of an improved self-loading dolly apparatus 100. In this embodiment, the dolly 100 has five separate components that are assembled together in use: a pair of tire bars 120, namely front tire bar 120F and rear tire bar 120R, a lift bar 150; and a pair of outside wheel assemblies 160.

The front tire bar 120F is intended to be positioned in front of, or to one side of, the tire or object to be lifted, while the rear tire bar 120R, which is a mirror image of the front tire bar 120F, is intended to be positioned in back of, or to the other side of, the tire or object to be lifted. Each of the tire bars 120F, 120R includes a corresponding inside wheel assembly 130F, 130R, respectively, that is integrated with the tire bar by being rigidly affixed at the inside end of the tire bar. A pair of wheel plates 131F, 131R is rigidly affixed and/or integrated with corresponding inside wheel assemblies 130F, 130R, respectively, and corresponding the tire bars 120F, 120R, respectively. The wheel plates 131F, 131 may either be part of a wheel support apparatus, or may be in addition to such apparatus, for example, as an intermediate piece between the tire support apparatus and the tire bar 120, or as part of the tire bar.

Each of the tire bars 120F, 120R also includes an integrated saddle bracket assembly 140F, 140R, respectively, rigidly affixed at the outside end of the tire bar. Each of the saddle bracket assemblies 140F, 140R includes a saddle or recess 141 sized and shaped for securely receiving the lift bar 150, as well as adequate mechanical hardware and/or features 142 for securing both the lift bar and the outside wheel assemblies 160 with the saddle bracket assemblies.

It is noted that the tire bars 120 are illustrated in FIG. 1 as lying flat on the ground, i.e., in the horizontal plane, and that in this position, the wheel plates 131 and the saddle brackets 140 are both affixed to respective tire bars at the same small rearward angle $\theta_1$ relative to the ground. This is the initial "unloaded" position of the dolly apparatus 100, with both tire bars 120 placed on the ground in front of and behind the tire or object. The size of the acute angle $\theta_1$ depends on the implementation details including the size and length of the dolly components, but will generally be between 15-30 degrees.

Figure 5:
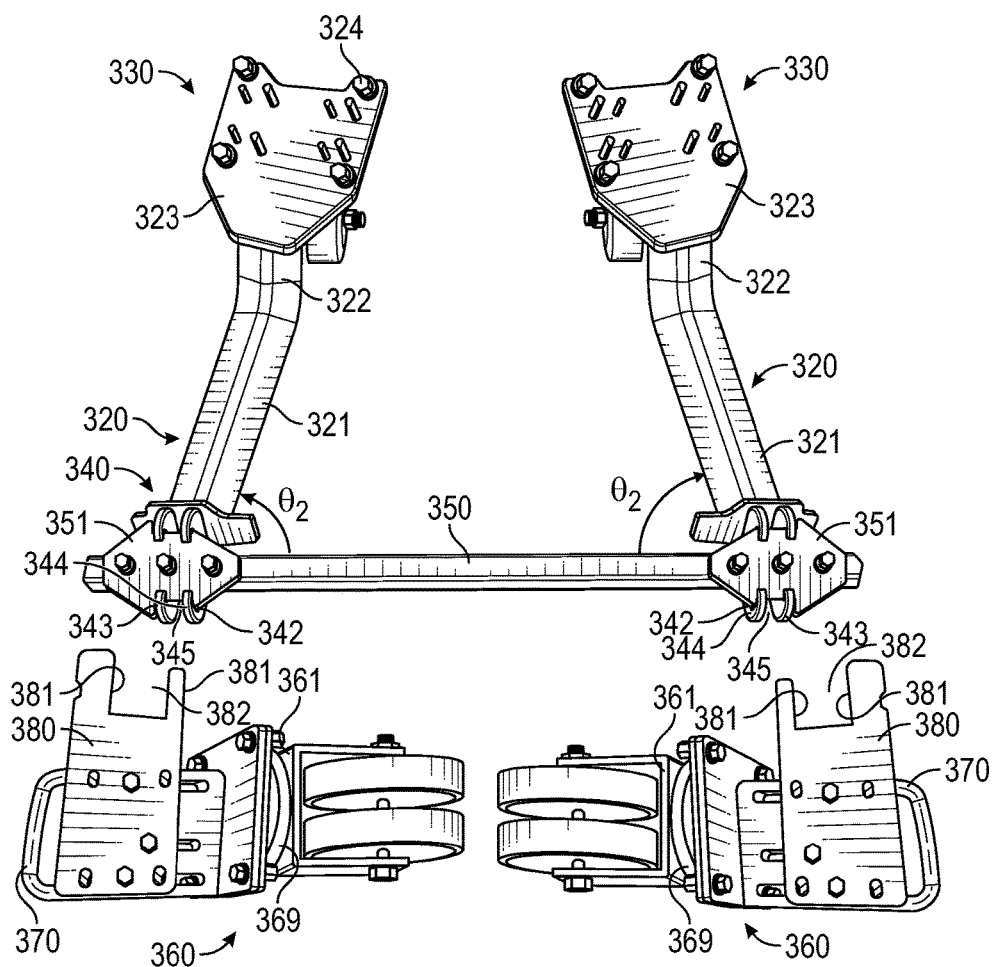
FIG. 5 is a top perspective view of one embodiment of a self-loading dolly, unassembled.

Once the tire bars 120 have been placed in front of and behind the tire or object, the lift bar 150 is dropped into the recesses 141 of both of the saddle brackets 140 and secured in place with appropriate locking mechanisms (described below) that are part of the mechanical hardware 142. It is also noted, as further discussed below, that the mechanical hardware 142 including the locking mechanisms that secure the lift bar 150 in place with the saddle brackets 140 are configured such that, when secured, the tire bars 120 are forced to angle inward toward each other at a small acute angle $\theta_2$, as shown in FIG. 5 The size of the acute angle $\theta_2$ also depends on the implementation details of the dolly components, but will generally be between 10-18 degrees.

Figure 3:
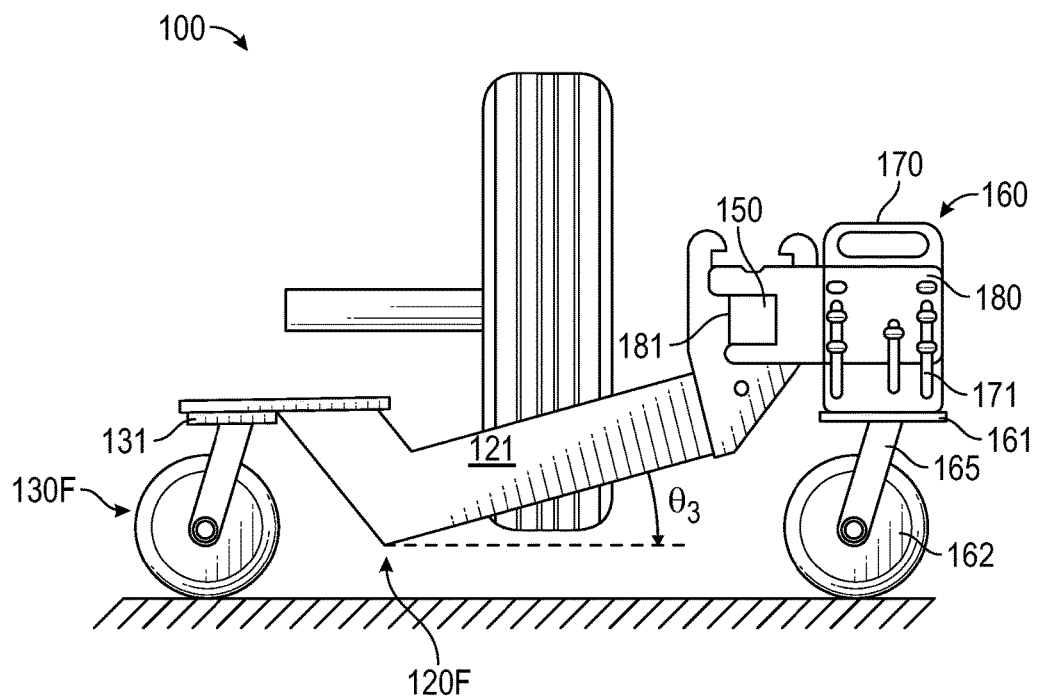
FIG. 3 is a side plan view of the self-loading dolly of FIG. 2 in the "loaded" position.
Figure 4:
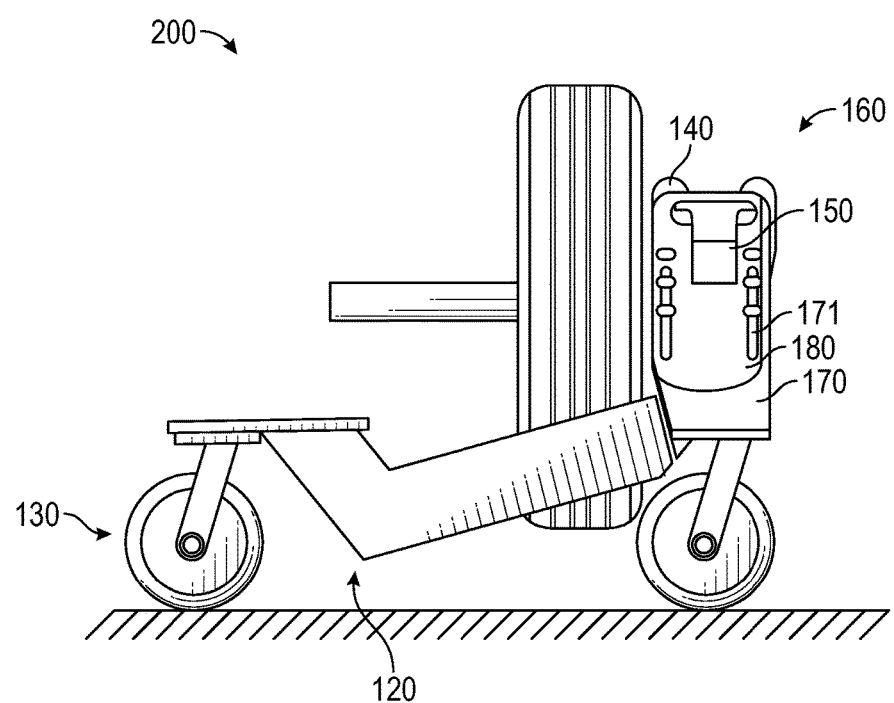
FIG. 4 is a side plan view of the self-loading dolly of FIG. 3 in the "loaded" position, with an alternative position for the outside wheel assembly.

A hydraulic jack is then used to raise the secured lift bar 150, which also raises the connected tire bars 120, and the outside wheels 160 including wheel plates 161 are then inserted under respective saddle brackets 140, and the wheel plates are secured to the saddle brackets using appropriate mechanical fasteners. With the outside wheels 160 secured in place, the jack is lowered thereby placing the weight of the object onto the outside wheels. This is considered the "loaded" position. The tire bars 120 are now angled upward at a small angle $\theta_3$, as shown in FIGS. 3-4, and both sets of wheel plates 131, 161 as well as the saddle brackets 140 are leveled out from their initial angled orientation to become parallel with the ground or horizontal plane. The size of the acute angle $\theta_3$ also depends on the implementation details of the dolly components, but will generally be between 25-40 degrees.

The tire bars 120 and the lift bar 150 are preferably made from conventional square structural steel tubing or equivalent materials cut to appropriate lengths, with connections by weldment. The wheel assemblies 130, 160 are preferably conventional caster wheels that are coupled to respective wheel plates with 360 degree rotational bearings appropriate for the specified load rating.

Figure 2:
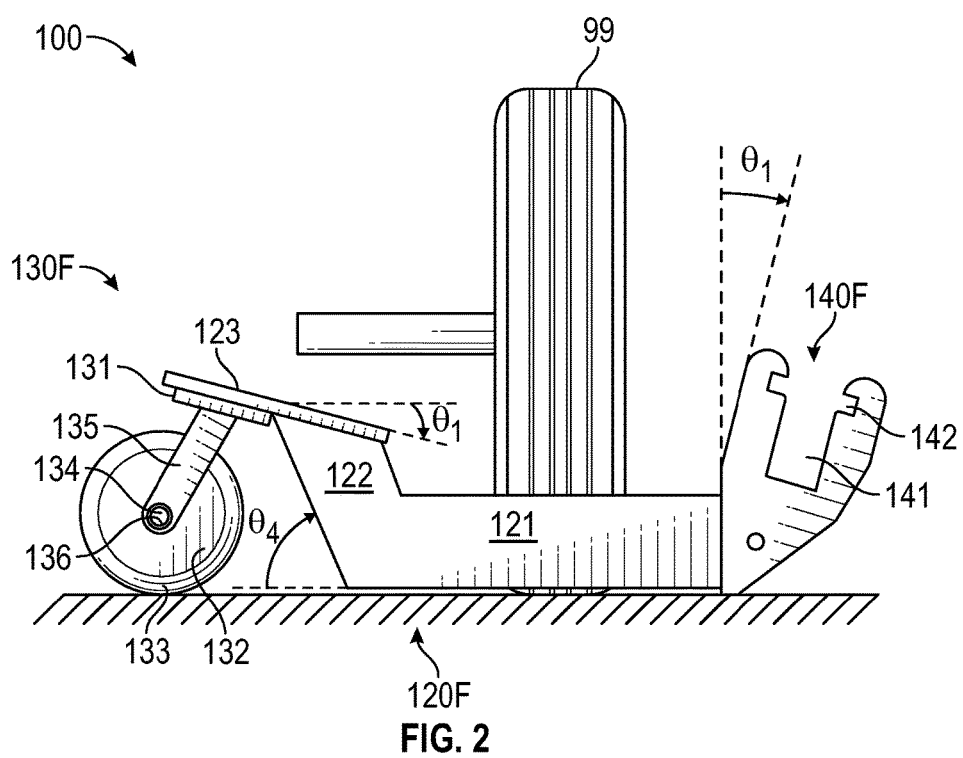
FIG. 2 is a side plan view of one embodiment of a self-loading dolly in the "unloaded" position.

FIG. 2 is a more detailed schematic illustration of one side of the dolly 100 showing the front tire bar 120F with integrated inside wheel assembly 130F and integrated saddle bracket assembly 140F placed in front of a tire 99. The corresponding rear tire bar 120R (not shown here) is placed behind the tire 99 and is constructed as a mirror image of the front tire bar 120F. As noted above, in this configuration, namely, with the pair of tire bars 120 placed in front of and behind the tire 99, the dolly 100 is in the unloaded state, resting on the ground.

The inside wheel assembly 130F includes a wheel 132 having an integral rubber tire 133 with an axle 134 through the wheel. The wheel plate 131 is spaced apart from the wheel 132 to provide clearance, and a pair of side plates 135 (only one is shown) extend orthogonally downward from opposite sides of the top plate, the side plates having openings 136 for receiving and securing the axle.

The tire bar 120F has a central portion 121 that is straight and lays flat in the horizontal plane in the unloaded position, but also an inside portion 122 that is angled upward at an acute angle $\theta_4$ relative to the central portion, generally in the range of about 15-40 degrees. An end plate 123 is affixed to the distal or inside end of the inside portion 122 of the tire bar and also to the top plate 131 of the inside caster wheel assembly 130F. Note that the end plate 123 and the top plate 131 are angled rearward at the angle $\theta_1$ in the unloaded position, as previously described.

The saddle bracket 140F is rigidly affixed to the proximal or outside end of the tire bar 120F. The saddle bracket 140F includes a slot 141 that is oriented in a lateral direction relative to the tire bar 120 for receiving the lift bar 150 between the pair of saddle brackets. The slot 141 is preferably rectangular or square to receive the lift bar 150 made of square structural steel tubing, but other shapes could be provided. A pair of notches 142 are also formed in the saddle bracket 130 adjacent the slot 141 for receiving a clamping plate (see FIG. 5) that secures the lift bar 150 in the slot 141. Note that the saddle bracket 130 is also angled slightly rearward in the unloaded position at the same angle $\theta_1$ as the wheel plate 131 and end plate 123.

FIG. 3 is another detailed schematic illustration of one side of the dolly 100 similar to FIG. 2, but with the dolly raised into the loaded position. To get to the loaded position, the lift bar 150 is placed into the slots 141 of both saddle brackets 140 and secured in place. The lift bar 150 is then raised, e.g., using a jack, and the outside wheel assemblies 160 are positioned adjacent the saddle brackets 140 and tightened in place. The jack is lowered and removed thereby loading the displaced weight onto the outside wheels 160.

In this embodiment, the lower portion of the outside wheel assembly 160 is virtually identical to the inside wheel assembly 130, with a top plate 161 having side plates 165 that support wheel 162. However, additional hardware is affixed on top of the top plate 161 for securing the outside wheel 160 to the saddle bracket 150 and further, for securing the lift bar 150 in place. For example, a vertical plate 170 is rigidly affixed to the top plate 161 and extends upwardly from the top plate. Elongated vertical slots 171 are formed on the vertical plate for accepting fasteners therethrough, and the slots allow for adjustment of the vertical height of the attached locking plate 180. The locking plate 180 is affixed via fasteners (not shown) secured in the slots 171 of the vertical plate 170. In this configuration, the locking plate 180 extends horizontally toward the saddle bracket 140 and lift bar 150. The locking plate 180 includes a rectangular recess 181, similar to the recess 141 in the saddle brackets 140, and the recess 181 is oriented orthogonally to recess 141 and pushed onto the lift bar 150, and the locking plate is secured to the vertical plate 170.

Thus, in the loaded position, the top plates 131 of the inside caster wheel assemblies 130 are matched in height and level with the top plates 161 of the outside caster wheel assemblies 160, while the tire bars 120 are now angled upward at angle $\theta_3$.

FIG. 4 is a detailed schematic illustration similar to FIG. 3, showing one side of an alternative dolly embodiment 200 in the loaded position. The dolly 200 includes the same tire bar configuration 120, with integrated inside wheel 130 and saddle bracket 140 as depicted in FIGS. 2-3. In this embodiment, however, the locking plate 180 is attached in a vertical orientation, rather than the horizontal orientation as in FIG. 3, with height adjustment obtained via fastening to elongated slots 171 on the vertical plate 170 of the outside wheel 160.

In this embodiment, the outside wheels are positioned much closer to the end of the lift bars, and this provides additional side clearance when needed in tight quarters. Further, the tire can be positioned completely touching the saddle bracket. In one example, a rolling jack could be positioned on the adjacent curb to reach under and raise the lift bar to slide the outside wheels in place. If the vehicle is tire is touching or otherwise too close to the curb, the dolly operator can install the dolly on the outer tires in order to position the vehicle away from the curb in order to allow clearance for installing casters on the curb side.

FIG. 5 illustrates illustrate one physical implementation of a dolly 300. In FIG. 5, the lift bar 350 is secured in the saddle brackets 340, but the outside wheel assemblies 360 have not been attached. In FIG. 6, the dolly 300 is fully assembled with the outside wheel assemblies 360 secured in place.

As shown in FIG. 5, the outside wheel assemblies 360 include a swivel-type caster wheel having a bearing assembly 369 mounted above the top plate 361 of the respective wheel assembly that allows 360 degree rotation of the wheels. The inside wheel assemblies 330 are similarly configured. Caster wheels of various size and load rating are readily available. The end plates 323 of the tire bars 320 are rigid steel plates fastened with bolts 324 to the top plates 331 of respective inside wheels 330.

The tire bars 320 are square structural steel tubing in two parts, a longer central portion 321 and a shorter inside or angled portion 322. The angled portion 322 is welded to the central portion at angle $\theta_3$. Note that the square steel tubing of the tire bars 320 is oriented such that one of the corners faces straight up leaving the adjacent flat sides sloped at a 45 degree angle.

The lift bar 350 is secured within saddle brackets 340 by a diamond-shaped plate 351 that is inserted through the notches 342 in the saddle bracket 340, and fastened to the lift bar with threaded bolts screwed into female threads (not shown) cut into the top of the lift bar. With the lift bar 350 secured in place, the saddle brackets 330 are configured such that distal or inside ends of the tire bars 320 are both angled toward each other at angle $\theta_2$.

If the tire bars were parallel, instead of being angled toward each other at angle $\theta_2$, as the tire is lifted, the weight ends up shifting to the outside of the dolly leaving the weight distribution lopsided and disproportional. By angling the tire bars toward each other at a small angle of 10-18 degrees, for example, the unattached tire balances perfectly on the tire bars in the loaded position. This is important for center loading the dolly, which is necessary in many wide tread applications, such as dual truck tires, aircraft tires, and other assemblies requiring equal center pressure across the tire tread area. Center loading on the dolly also maintains center loading of the axle spindles and bearings, which is mandatory for aircraft applications.

In this embodiment, each of the saddle brackets 340 is constructed as a two-piece component having substantially identical pieces 343, 344 welded together but with a separation or gap 345 created between the two pieces, at least at the top and bottom of the bracket. The locking plate 380 that is fastened to vertical plate 370 has top and bottom tabs 381 that are inserted into the gap 345 of the saddle brackets 340, thereby moving the rectangular (or square) opening 346 between the tabs onto and covering the lift bar 350.

In one alternative embodiment, the tire bars can be inverted and placed over or under framework, for example, a helicopter skid, fastened to the dolly with available clamps and lifted.

In another alternative embodiment, in a tandem axle configuration, such as RVs, boast trailers, trucks, etc., the lift bar can be lengthened or shortened to accommodate two, three or more axels in tandem.

In yet another embodiment, tire paddles can be used by fastening as a pivoting connection to the central portion of the tire bar.

While one or more implementations have been described by way of example and in terms of specific embodiments, it should be understood that one or more implementations are not limited to the disclosed embodiments. To the contrary, this disclosure is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A dolly apparatus, comprising:
    a pair of coupling brackets disposed in a spaced apart parallel arrangement in a horizontal plane;
    a lift bar removably coupled to each of the pair of coupling brackets;
    a pair of support bars each having an inside end and an outside end, each support bar rigidly coupled at its outside end to a respective one of the pair of coupling brackets at a first acute angle relative to the lift bar such that the support bars are angled inward toward each other;
    a first pair of wheel assemblies, each of the first pair of wheel assemblies coupled to the inside end of a respective one of the pair of support bars at a second acute angle such that the wheel assemblies are offset from a vertical axis; and
    a second pair of wheel assemblies, each of the second pair of wheel assemblies is removably coupled to a respective one of the pair of coupling brackets after the lift bar is raised in order to position each of the second pair of wheel assemblies adjacent the respective coupling bracket, then the lift bar is lowered and the second pair of wheel assemblies secured to respective brackets;
    wherein positioning and securing the second pair of wheel assemblies causes the first pair of wheel assemblies to level out and align with the vertical axis and the first pair of support bars to angle upward at the second acute angle.

2. The dolly apparatus of claim 1, each of the first and second pairs of wheel assemblies further comprising a top plate supporting a wheel, wherein the respective top plates of the first pair of wheel assemblies are coupled to respective inside ends of respective ones of the pair of support bars at the second acute angle.

3. The dolly apparatus of claim 2, each of the second pair of wheel assemblies further comprising a vertical plate affixed above the top plate, and a locking plate coupled to the vertical plate and to a respective one of the pair of coupling brackets.

4. The dolly apparatus of claim 3, further comprising a pair of clamps, each clamp securing the lift bar and one of the locking plates to a respective one of the pair of coupling brackets.

5. The dolly apparatus of claim 3, each of the locking plates further comprising a recess shaped to slide over the lift bar.

6. The dolly apparatus of claim 3, each of the pair of coupling brackets is a pair of spaced-apart flanges rigidly affixed to the outside end of the respective support bar at the second angle, each pair of the spaced-apart flanges configured to receive a respective one of the locking plates.

7. The dolly of claim 2, each of the pair of support bars further comprising an inside portion forming the inside end of the support bar, the inside portion rigidly affixed at one end to a central portion at a third angle and rigidly affixed to a respective one of the top plates, the third angle is less than the second angle.

8. The dolly apparatus of claim 2, wherein each of the first and second pairs of wheel assemblies includes caster wheels.

9. The dolly apparatus of claim 1, each of the pair of coupling brackets further comprising a coupling plate, wherein the respective one of the coupling plates are coupled to the outside ends of respective ones of the pair of support bars at the second acute angle.

10. The dolly apparatus of claim 9, each of the coupling plates further comprising a recess formed in respective ones of the coupling plates shaped to accept the lift bar.

11. The dolly apparatus of claim 10, each of the pair of coupling brackets further comprising hardware affixed with the respective coupling bracket to secure the lift bar in the recess.

12. A dolly apparatus, comprising:
first and second support bars, each support bar having a distal end and a proximal end, each support bar having an upward angled portion at its distal end;
first and second wheel assemblies, each of the first and second wheel assemblies having a top plate rigidly affixed to the angled portion of a respective one of the first and second support bars such that the top plate is disposed at a first angle upward relative to the support bars;
first and second saddle brackets disposed in a spaced apart parallel arrangement, each of the saddle brackets coupled to the proximal end of a respective one of the first and second support bars such that the saddle bracket is offset from a vertical axis at the first angle;
third and fourth wheel assemblies each removably coupled to a respective one of the first and second saddle brackets; and
a lift bar removably coupled to the first and second saddle brackets;
wherein the lift bar is raised to place the third and fourth wheel assemblies adjacent respective saddle brackets, then lowered to secure the third and fourth wheel assemblies to the saddle brackets, which causes the first and second wheel assemblies to level out and align with the vertical axis and the first pair of support bars to angle upward at the first angle.

13. The dolly apparatus of claim 12, wherein each of the first and second brackets is configured to couple the first and second support bars, respectively, at a second angle such that the support bars angle inward toward each other.

14. The dolly apparatus of claim 12, each of the first and second saddle brackets including a recess shaped to accept the lift bar.

15. The dolly apparatus of claim 12, each of the third and fourth wheel assemblies includes a vertical plate extending from the top plate, and a locking plate adjustably coupled to the vertical plate and to a respective one of the first and second saddle brackets.

16. The dolly apparatus of claim 15, further comprising first and second clamps, each clamp securing the lift bar and a respective one of the locking plates to a respective one of the saddle brackets.

17. A dolly apparatus, comprising:
a pair of support bars each having an inside end and an outside end,
a pair of saddle brackets disposed in a spaced apart parallel arrangement, each support bar rigidly coupled at its outside end to a respective one of the saddle brackets such that the saddle bracket is offset from a vertical axis by a first angle;
a first pair of wheel assemblies, each of the first pair of wheel assemblies coupled to the inside end of a respective one of the pair of support bars such that the wheel assemblies are offset from the vertical axis by the first angle;
a lift bar removably coupled to the saddle brackets;
a second pair of wheel assemblies, each of the second pair of wheel assemblies is positioned adjacent a respective one of the saddle brackets after raising the lift bar, then secured to the saddle bracket when the lift bar is lowered, wherein the first pair of wheel assemblies and the pair of saddle brackets align with the vertical axis and the outside ends of respective ones of the pair of support bars are angled upward at the first angle.

18. The dolly apparatus of claim 17, wherein each of the first and second saddle brackets is configured to couple the first and second support bars, respectively, at a second angle such that the support bars angle inward toward each other.

19. The dolly apparatus of claim 17, each of the second pair of wheel assemblies includes a vertical plate and a locking plate adjustably coupled to the vertical plate and to a respective one of the first and second saddle brackets.

20. The dolly apparatus of claim 17, wherein each of the pair of saddle brackets and each the first pair of wheel assemblies is integrated with a respective one of the pair of support bars.

* * * * *